(12) United States Patent
Tang et al.

(10) Patent No.: US 11,017,270 B2
(45) Date of Patent: May 25, 2021

(54) METHOD AND APPARATUS FOR IMAGE PROCESSING FOR VEHICLE (71) Applicant: Baidu Online Network Technology (Beijing) Co., Ltd., Beijing (CN)

(72) Inventors: Kun Tang, Beijing (CN); Hao Yu, Beijing (CN); Yongshan Yan, Beijing (CN); Chao Zheng, Beijing (CN); Yunfei Zhang, Beijing (CN); Yu Jiang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 90 days.

(21) Appl. No.: 16/566,824

(22) Filed: Sep. 10, 2019

(65) Prior Publication Data

US 2020/0005091 A1    Jan. 2, 2020

Related U.S. Application Data

(63) Continuation of application No. PCT/CN2018/100248, filed on Aug. 13, 2018.

(30) Foreign Application Priority Data

Sep. 5, 2017   (CN) .......................... 201710791373.9

(51) Int. Cl.
*G06K 9/62* (2006.01)
*G06K 9/46* (2006.01)
*G06N 3/08* (2006.01)

(52) U.S. Cl.
CPC ............ *G06K 9/6262* (2013.01); *G06K 9/46* (2013.01); *G06K 9/6255* (2013.01); *G06N 3/08* (2013.01)

(58) Field of Classification Search
CPC ...... G06K 9/6262; G06K 9/46; G06K 9/6255; G06K 9/00791; G06K 9/6256; G06K 9/6267; G06N 3/08
See application file for complete search history.

(56) References Cited

U.S. PATENT DOCUMENTS 9,809,956 B1    11/2017  Sherlock
2016/0210383 A1  7/2016  Alaniz et al.
(Continued)

FOREIGN PATENT DOCUMENTS

CN    102041824 A    5/2011
CN    102947513 A    2/2013
(Continued)

OTHER PUBLICATIONS

International Search Report dated Nov. 16, 2018 in International Patent Application No. PCT/CN2018/1000248, 4 pages.
(Continued)

*Primary Examiner* — John B Strege
(74) *Attorney, Agent, or Firm* — Kilpatrick Townsend & Stockton LLP (57) ABSTRACT

A method and an apparatus for image processing for a vehicle are provided. The method includes: acquiring an image presenting a target object; occluding at least one area of the image to obtain at least one occluded image; inputting the at least one occluded image into a pre-trained image processing model to obtain a driving parameter corresponding to each of the at least one occluded image; determining, for each driving parameter, a difference between the driving parameter and a real driving parameter corresponding to the acquired image; and determining whether the difference between the driving parameter of the occluded image occluding at least one area where the target object is located and the real driving parameter is greater than or equal to a difference threshold, to determine a degree of association
(Continued)

between the state of the target object and the driving parameter.

11 Claims, 5 Drawing Sheets

(56) References Cited

U.S. PATENT DOCUMENTS

2016/0350601 A1* 12/2016 Grauer .................. G06T 11/60
2017/0083772 A1   3/2017 Kim et al.
2019/0028656 A1*  1/2019 Timoneda ............ H04N 5/2624
2019/0188506 A1*  6/2019 Siboni ................. H04N 9/3185

FOREIGN PATENT DOCUMENTS

| CN | 106547588 A | 3/2017 |
| CN | 106779089 A | 5/2017 |
| CN | 107527074 A | 12/2017 |
| EP | 2 204 503 A2 | 7/2010 |
| EP | 2963581 A1 | 6/2016 |

OTHER PUBLICATIONS

Bolei Zhou et al., "Object Detectors Emerge in Deep Scene CNNs," Computer Science and Artificial Intelligence Laboratory, MIT, 1-12, 12 pages, Published as a conference paper at ICLR 2015; arXiv:1412.6856v2 [cs.CV] Apr. 15, 2015.

* cited by examiner

METHOD AND APPARATUS FOR IMAGE PROCESSING FOR VEHICLE

CROSS-REFERENCE TO RELATED APPLICATIONS

The present patent application is a continuation of International Application No. PCT/CN2018/100248, filed on Aug. 13, 2018, which claims priority to Chinese Patent Application No. 201710791373.9, filed on Sep. 5, 2017, titled "Method and Apparatus for Image Processing for Vehicle", the applicant of which is "Baidu Online Network Technology (Beijing) Co., Ltd". Both of the aforementioned patent applicants are hereby incorporated by reference in their entireties.

TECHNICAL FIELD

The present disclosure relates to the field of computer technology, specifically to the field of Internet technology, and more specifically to a method and apparatus for image processing for a vehicle.

BACKGROUND

With the development of deep learning technology, the deep learning technology is increasingly more widely applied to the field of driving. It is necessary to implement the deep learning technology using a model, but in the existing technology, it is very difficult to determine the learning effect of the model applied to the deep learning technology.

SUMMARY

An object of the present disclosure includes providing an improved method and apparatus for image processing for a vehicle, to solve the technical problems mentioned in the above background section.

In a first aspect, an embodiment of the present disclosure provides a method for image processing for a vehicle, including: acquiring an image presenting a target object; occluding at least one area of the acquired image to obtain at least one occluded image; inputting the at least one occluded image into a pre-trained image processing model to obtain a driving parameter corresponding to each of the at least one occluded image, the image processing model being configured to characterize a corresponding relationship between a state of the object presented in the image and the driving parameter of the vehicle; determining, for each driving parameter, a difference between the driving parameter and a real driving parameter corresponding to the acquired image; and determining whether the difference between the driving parameter of the occluded image occluding at least one area where the target object is located and the real driving parameter is greater than or equal to a difference threshold, to determine a degree of association between the state of the target object and the driving parameter.

In some embodiments, the driving parameter includes a steering wheel angle and/or a driving speed.

In some embodiments, the method further includes: generating a thermodynamic diagram denoting the difference based on the difference between the driving parameter corresponding to the occluded image for each of the at least one occluded area of the acquired image and the real driving parameter.

In some embodiments, the determining whether the difference between the driving parameter of the occluded image occluding at least one area where the target object is located and the real driving parameter is greater than or equal to a difference threshold, to determine a degree of association between the state of the target object and the driving parameter includes: determining the degree of association between the state of the target object and the driving parameter being strong, in response to determining the difference between the driving parameter of the occluded image occluding at least one area where the target object is located and the real driving parameter being greater than or equal to the difference threshold; and determining the degree of association between the state of the target object and the driving parameter being weak, in response to determining the difference between the driving parameter of the occluded image occluding at least one area where the target object is located and the real driving parameter being smaller than the difference threshold.

In some embodiments, before the inputting the at least one occluded image into a pre-trained image processing model to obtain a driving parameter corresponding to each of the at least one occluded image, the method further includes: training a pre-established image processing model based on an end to end approach to obtain the pre-trained image processing model; extracting a feature of the target object from at least one image presenting the target object; and adding the extracted feature of the target object to a feature database of the image processing model.

In a second aspect, the present disclosure provides an apparatus for image processing for a vehicle, including: an acquiring unit configured to acquire an image presenting a target object; an occluding unit configured to occlude at least one area of the acquired image to obtain at least one occluded image; an inputting unit configured to input the at least one occluded image into a pre-trained image processing model to obtain a driving parameter corresponding to each of the at least one occluded image, the image processing model being configured to characterize a corresponding relationship between a state of the object presented in the image and the driving parameter of the vehicle; a difference determining unit configured to determine, for each driving parameter, a difference between the driving parameter and a real driving parameter corresponding to the acquired image; and a determining unit configured to determine whether the difference between the driving parameter of the occluded image occluding at least one area where the target object is located and the real driving parameter is greater than or equal to a difference threshold, to determine a degree of association between the state of the target object and the driving parameter.

In some embodiments, the driving parameter includes a steering wheel angle and/or a driving speed.

In some embodiments, the apparatus further includes: a generating unit configured to generate a thermodynamic diagram denoting the difference based on the difference between the driving parameter of the occluded image for each of the at least one occluded area of the acquired image and the real driving parameter.

In some embodiments, the determining unit includes: a first determining module configured to determine the degree of association between the state of the target object and the driving parameter being strong, in response to determining the difference between the driving parameter of the occluded image occluding at least one area where the target object is located and the real driving parameter being greater than or equal to the difference threshold; and a second determining module configured to determine the degree of association between the state of the target object and the driving parameter being weak, in response to determining the difference between the driving parameter of the occluded image occluding at least one area where the target object is located and the real driving parameter being smaller than the difference threshold.

In some embodiments, the apparatus further includes: a first training unit configured to train a pre-established image processing model based on an end to end approach to obtain the pre-trained image processing model; an extracting unit configured to extract a feature of the target object from at least one image presenting the target object; and an adding unit configured to add the extracted feature of the target object to a feature database of the image processing model.

In a third aspect, an embodiment of the present disclosure provides a vehicle, including: one or more processors; and a storage apparatus configured to store one or more programs, where the one or more programs, when executed by the one or more processors, cause the one or more processors to implement the method according to any one of embodiments of the method for image processing for a vehicle.

In a fourth aspect, an embodiment of the present disclosure provides a computer readable storage medium, storing a computer program thereon, where the program, when executed by a processor, implements the method according to any one of embodiments of the method for image processing for a vehicle.

The embodiments of the present disclosure provide the method and apparatus for image processing for a vehicle. The method includes: first acquiring an image presenting a target object; then, occluding different areas of the image to obtain a plurality of different occluded images; then, inputting the plurality of occluded images into a pre-trained image processing model to obtain a plurality of driving parameters corresponding to the plurality of occluded images, the image processing model being configured to characterize a corresponding relationship between a state of the object presented in the image and the driving parameter of the vehicle; then, determining, for each driving parameter, a difference between the driving parameter and a real driving parameter corresponding to the acquired image; and finally, determining whether the difference between the driving parameter of the occluded image occluding at least one area where the target object is located and the real driving parameter is greater than or equal to a difference threshold, thereby determining a degree of association between the state of the target object and the driving parameter by determining whether the difference between the driving parameter of the occluded image occluding at least one area where the target object is located and the real driving parameter is greater than or equal to the difference threshold, and then determining learning status of the image processing model on a feature of the state of the target object.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
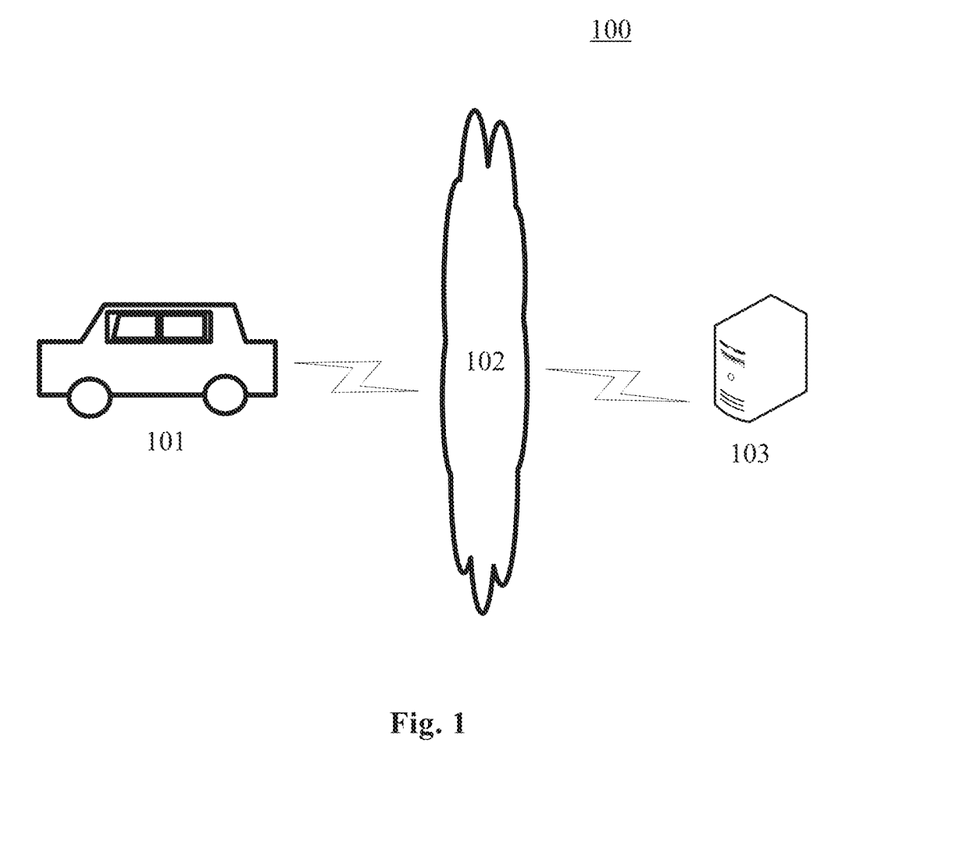
FIG. 1 is an architectural diagram of an exemplary system in which some embodiments of the present disclosure may be implemented.

FIG. 1 shows an exemplary system architecture 100 in which a method for image processing for a vehicle or an apparatus for image processing for a vehicle of some embodiments of the present disclosure may be implemented.

As shown in FIG. 1, the system architecture 100 may include a vehicle 101, a network 102, and a server 103. The network 102 serves as a medium providing a communication link between the vehicle 101 and the server 103. The network 102 may include various types of connections, such as wired or wireless communication links, or optical fibers.

A user may interact with the server 103 using the vehicle 101 via the network 102, for example, to receive or send a message. The vehicle 101 may be provided with various communication client applications.

The vehicle 101 may be various electronic devices supporting image acquisition and capable of performing image processing, e.g., vehicles, and autonomous vehicles.

The server 103 may be a server that provides various services. The server 103 can perform processing, e.g., analysis, and return the processing result to the terminal device.

It should be noted that the method for image processing for a vehicle provided by the embodiment of the present disclosure is generally executed by the vehicle 101. Accordingly, the apparatus for image processing for a vehicle is generally provided in the vehicle 101.

It should be understood that the numbers of terminal devices, networks, and servers in FIG. 1 are merely illustrative. Any number of terminal devices, networks, and servers may be provided based on actual requirements.

Figure 2:
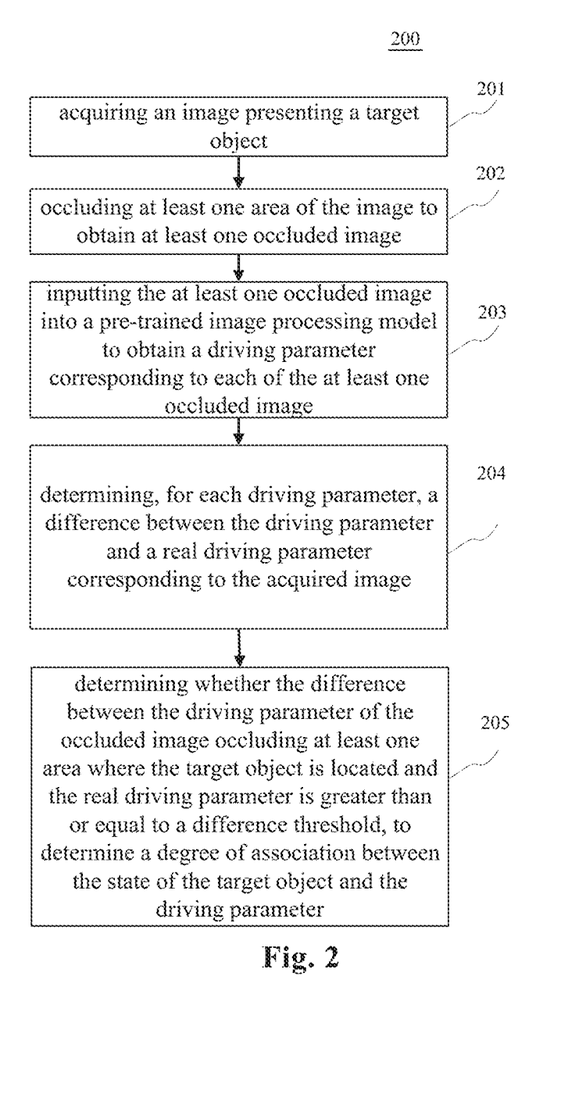
FIG. 2 is a flowchart of a method for image processing for a vehicle according to some embodiments of the present disclosure.

Further referring to FIG. 2, a process 200 of a method for image processing for a vehicle according to some embodiments of the present disclosure is shown. The method for image processing for a vehicle includes the following steps 201 to 205.

Step 201: acquiring an image presenting a target object.

In the present embodiment, a vehicle on which the method for image processing for a vehicle is implemented acquires an image locally or from other electronic device. The image is an image presenting the target object. The target object is a randomly selected or manually set object presented in the image. The target object may be a signal light (such as traffic lights), or a steering indicator, or the like.

Step 202: occluding at least one area of the image to obtain at least one occluded image.

In the present embodiment, the vehicle occludes at least one area of the image, and may obtain one occluded image by occluding each of the at least one area. After occluding at least one different area, at least one different occluded image may be obtained. Areas of the image are preset, and may be areas of a given size or different sizes. The occluded image is the image in which an area is occluded.

Here, the image may be occluded using an occluder of a fixed size. The occluder may alternatively have an unfixed size. Here, a plurality of occluded areas may be areas occupying the whole image or merely occupying a portion of the image.

Step 203: inputting the at least one occluded image into a pre-trained image processing model to obtain a driving parameter corresponding to each of the at least one occluded image.

In the present embodiment, the vehicle inputs the at least one different occluded image into the pre-trained image processing model to obtain driving parameters outputted from the image processing model. Each of the driving parameters corresponds to one occluded image, and a plurality of occluded images corresponds to a plurality of driving parameters. The image processing model is configured to characterize a corresponding relationship between a state of the object presented in the image and the driving parameter of the vehicle. The driving parameter is a parameter for controlling the vehicle involved in driving the vehicle, and affects the driving the vehicle. The image processing model may be trained by a classifier, such as a Support Vector Machine (SVM), or a Naive Bayes Model (NBM). Furthermore, the image processing model may be pre-trained based on some classification functions (e.g., a softmax function).

The target object may have different states. For example, if the target object is a traffic light, then states of the traffic light may include turning on red light, yellow light, or green light respectively.

In some alternative implementations of the present embodiment, the image processing model may be obtained by end to end training.

In some alternative implementations of the present embodiment, the driving parameter includes a steering wheel angle and/or a driving speed.

In the present embodiment, the steering wheel angle may be used to control a driving direction of the vehicle, and the driving speed may be used to control a speed of the vehicle. In addition, the driving parameter may alternatively include an acceleration of the vehicle, etc.

Step 204: determining, for each driving parameter, a difference between the driving parameter and a real driving parameter corresponding to the acquired image.

In the present embodiment, for each of the driving parameters obtained in step 203, the vehicle determines the difference between the driving parameter and the real driving parameter corresponding to the above acquired image. The above acquired image has a corresponding real driving parameter. The real driving parameter is a driving parameter that is used by a driver when encountering the target object of the above acquired image when driving the vehicle in a real scenario that the driver is driving. The difference between the driving parameter and the real driving parameter may be obtained by subtracting the driving parameter from the real driving parameter or the real driving parameter from the driving parameter.

Step 205: determining whether the difference between the driving parameter of the occluded image occluding at least one area where the target object is located and the real driving parameter is greater than or equal to a difference threshold, to determine a degree of association between the state of the target object and the driving parameter.

In the present embodiment, the vehicle determines whether the difference between the driving parameter of the occluded image occluding at least one area where the target object is located and the real driving parameter is greater than or equal to the difference threshold, and then determines the degree of association between the state of the target object and the driving parameter. The degree of association is a degree of mutual association between one or more states of the target object in the image and the driving parameter. If the outputted driving parameter of the vehicle after the target object in the image is occluded is greatly different from the outputted driving parameter of the vehicle before the target object in the image is occluded, i.e., the state of the target object have a great impact on the driving parameter, then the degree of association between the state of the target object and the driving parameter is strong. The state of the target object here refers to a state of the target object presented in the image.

Since areas in the image may be of different preset sizes, the target object may occupy one area or a plurality of areas in the image. After determining the difference between the driving parameter of the occluded image occluding at least one area where the target object is located and the real driving parameter, the vehicle can determine whether at least one difference is greater than or equal to the difference threshold. The difference threshold is a preset threshold of the difference. If each of the at least one difference is greater than or equal to the difference threshold, then the difference between the driving parameter of the occluded image occluding at least one area where the target object is located and the real driving parameter being greater than or equal to the difference threshold is determined.

Before determining whether the difference is greater than the difference threshold, the vehicle may identify the image to determine an area including the target object in the image.

Figure 3:
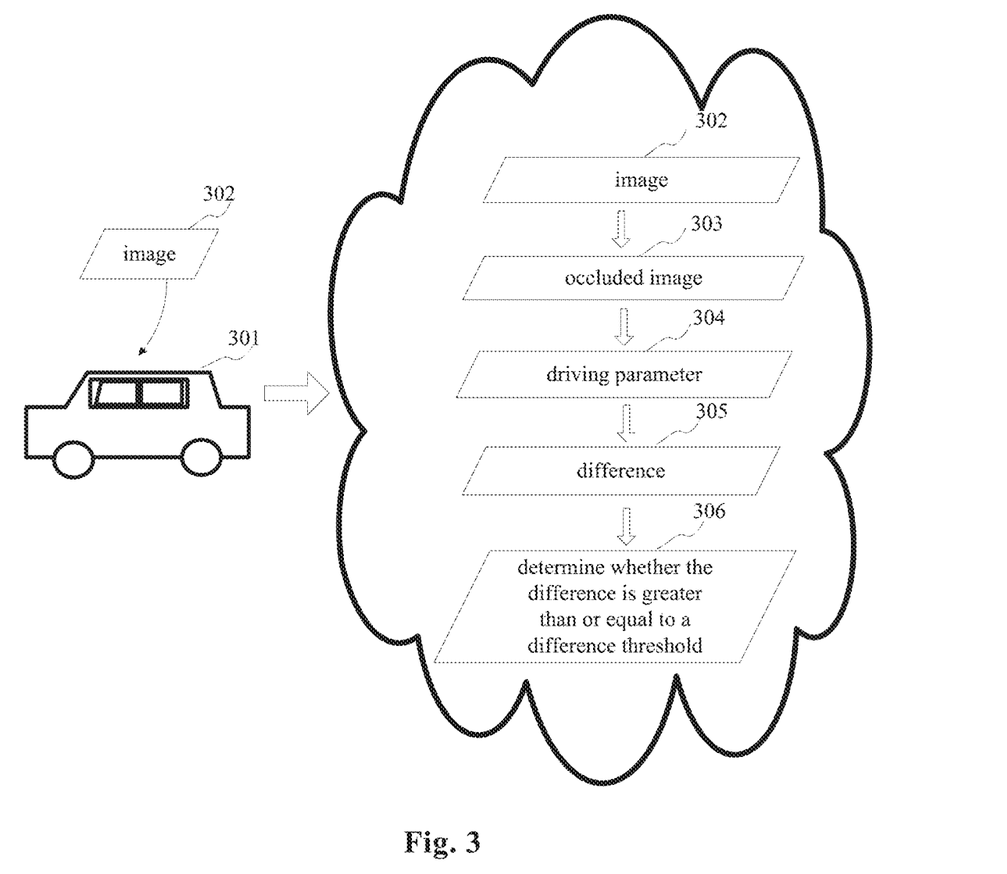
FIG. 3 is a schematic diagram of an application scenario of the method for image processing for a vehicle according to some embodiments of the present disclosure.

Further referring to FIG. 3, FIG. 3 is a schematic diagram of an application scenario of the method for image processing for a vehicle according to the present embodiment. In the application scenario of FIG. 3, the vehicle 301 acquires an image 302 presenting a target object. Then, the vehicle occludes at least one area of the image to obtain at least one occluded image 303; inputs the at least one occluded image into a pre-trained image processing model to obtain a driving parameter 304 corresponding to each of the at least one occluded image, the image processing model being configured to characterize a corresponding relationship between a state of the object presented in the image and the driving parameter of the vehicle; determines, for each of the driving parameter corresponding to the at least one occluded image, a difference 305 between the driving parameter and a real driving parameter corresponding to the acquired image; and determines whether the difference between the driving parameter of the occluded image occluding at least one area where the target object is located and the real driving parameter is greater than or equal to a difference threshold 306, to determine a degree of association between the state of the target object and the driving parameter.

In the method according to the above embodiments of the present disclosure, whether the difference between the driving parameter of the occluded image occluding at least one area where the target object is located and the real driving parameter is greater than or equal to the difference threshold is determined, thereby determining a degree of association between the state of the target object and the driving parameter, and then determining learning status of the image processing model on a feature of the state of the target object.

Figure 4:
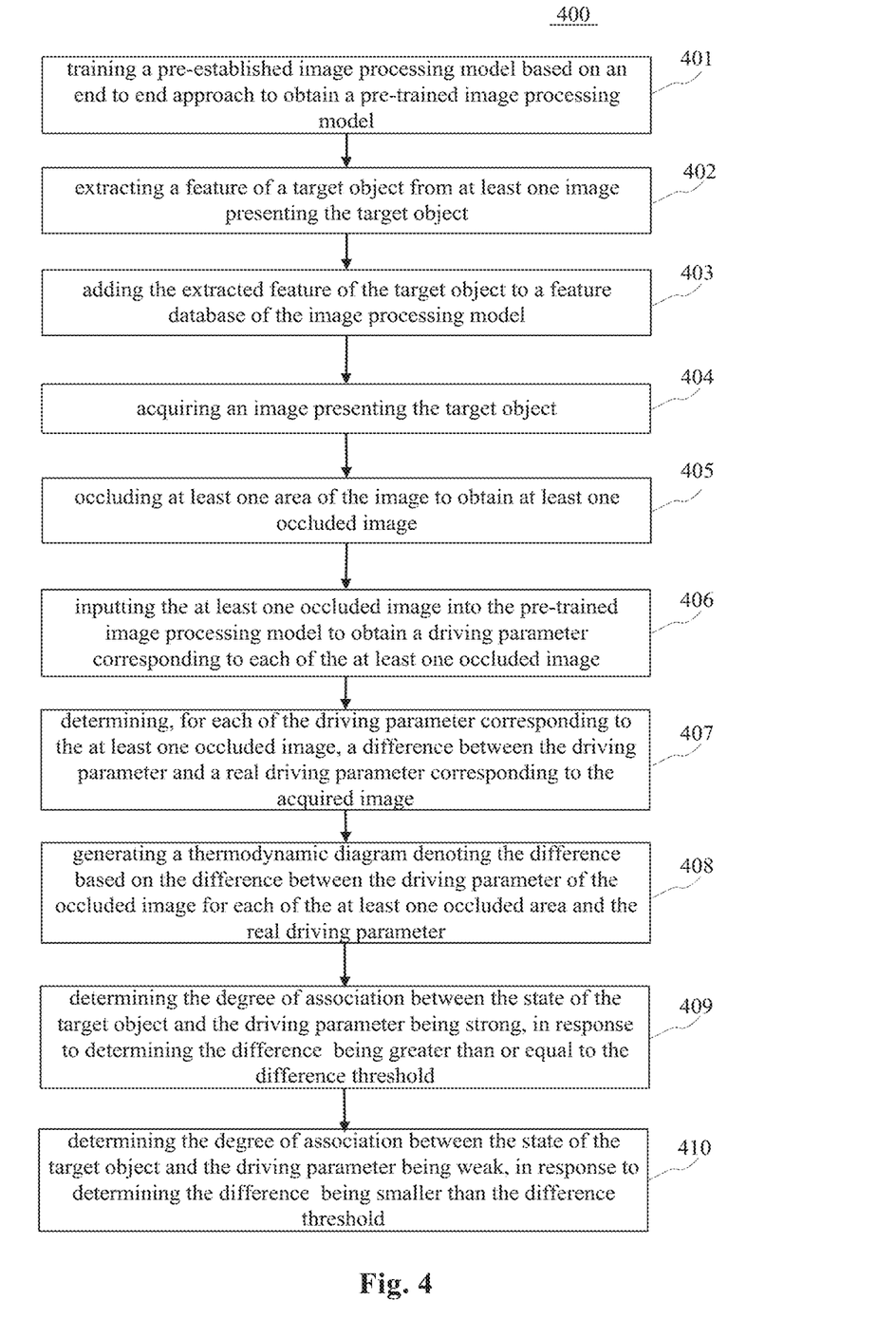
FIG. 4 is a flowchart of the method for image processing for a vehicle according to other embodiments of the present disclosure.

Further referring to FIG. 4, a process 400 of another embodiment of the method for image processing for a vehicle is shown. The process 400 of the method for image processing for a vehicle includes the following steps 401 to 410.

Step 401: training a pre-established image processing model based on an end to end approach to obtain a pre-trained image processing model.

In the present embodiment, the vehicle trains the pre-established image processing model based on the end to end approach to obtain the pre-trained image processing model.

Step 402: extracting a feature of a target object from at least one image presenting the target object.

In the present embodiment, the vehicle extracts the feature of the target object from the at least one image presenting the target object. The target object is presented in each image of the at least one image. The target object in the at least one image may be in different states. The feature of the target object is an image feature associated with the target object.

Step 403: adding the extracted feature of the target object to a feature database of the image processing model.

In the present embodiment, the vehicle adds the extracted feature of the target object to the feature database of the image processing model. The image processing model includes the feature database. The feature database is a database configured to store features related to the target object in the image. The features of states of the target object are added to the feature database of the model, such that the model learns the features of the states of the target object.

Step 404: acquiring an image presenting the target object.

In the present embodiment, a vehicle on which the method for image processing for the vehicle is implemented acquires the image locally or from another electronic device. The image is an image presenting the target object. The target object is an object presented in a randomly selected or manually set image. The target object may be a signal light (such as traffic lights), or a steering indicator, or the like.

Step 405: occluding at least one area of the image to obtain at least one occluded image.

In the present embodiment, the vehicle occludes at least one area of the image, and may obtain one occluded image by occluding each of the at least one area. After occluding at least one different area, at least one different occluded image may be obtained. The areas are preset areas in the image, and may be areas of a given size or different sizes. The occluded image is an image in which an area is occluded.

Here, the image may be occluded using an occluder of a fixed size. The occluder may alternatively be of an unfixed size. Here, the occluded areas may be areas occupying the whole image or merely occupying a portion of the image.

Step 406: inputting the at least one occluded image into the pre-trained image processing model to obtain a driving parameter corresponding to each of the at least one occluded image.

In the present embodiment, the vehicle inputs the at least one different occluded image into the pre-trained image processing model to obtain driving parameters outputted from the image processing model. Each of the driving parameters corresponds to one occluded image, and a plurality of occluded images corresponds to a plurality of driving parameters. The image processing model is configured to characterize a corresponding relationship between a state of the object presented in the image and the driving parameter of the vehicle. The driving parameter is a parameter for controlling the vehicle involved in driving the vehicle, and affects the driving the vehicle. The image processing model may be trained by a classifier, such as a Support Vector Machine (SVM), or a Naive Bayes Model (NBM). Furthermore, the image processing model may be pre-trained based on some classification functions (e.g., a softmax function).

Step 407: determining, for each driving parameter, a difference between the driving parameter and a real driving parameter corresponding to the acquired image.

In the present embodiment, for each of the obtained driving parameters, the vehicle determines the difference between the driving parameter and the real driving parameter corresponding to the above acquired image. The above acquired image has a corresponding real driving parameter. The real driving parameter is a driving parameter that is used by a driver when encountering the target object in the above image during driving the vehicle in a real scenario that the driver is driving. The difference between the driving parameter and the real driving parameter may be obtained by subtracting the driving parameter from the real driving parameter or subtracting the real driving parameter from the driving parameter.

Step 408: generating a thermodynamic diagram denoting the difference based on the difference between the driving parameter of the occluded image for each of the at least one occluded area and the real driving parameter.

In the present embodiment, the vehicle generates the thermodynamic diagram denoting the difference based on the difference between the driving parameter of the occluded image for each of the at least one occluded area and the real driving parameter. An area with a deepest color in the thermodynamic diagram indicates a maximum difference. The difference corresponds to a color depth in the thermodynamic diagram. The greater the difference corresponding to an area is, the deeper the color of the area in the thermodynamic diagram is. Therefore, the difference corresponding to an area in the image can be clearly seen from the thermodynamic diagram. Thus, difference status corresponding to an area including the target object can be known, and then learning status of the model on state information of the object in various areas can be known.

Step 409: determining the degree of association between the state of the target object and the driving parameter being strong, in response to determining the difference between the driving parameter of the occluded image occluding at least one area where the target object is located and the real driving parameter being greater than or equal to the difference threshold.

In the present embodiment, after determining the difference between the driving parameter of the occluded image occluding at least one area where the target object is located and the real driving parameter being greater than or equal to the difference threshold, the vehicle makes a response: determining the degree of association between the state of the target object and the driving parameter being strong, and then determining that the image processing model learns a feature of the state of the target object.

Step 410: determining the degree of association between the state of the target object and the driving parameter being weak, in response to determining the difference between the driving parameter of the occluded image occluding at least one area where the target object is located and the real driving parameter being smaller than the difference threshold.

In the present embodiment, after determining the difference between the driving parameter of the occluded image occluding at least one area where the target object is located and the real driving parameter being smaller than the difference threshold, the vehicle makes a response: determining the degree of association between the state of the target object and the driving parameter being weak, and then determining that the image processing model does not learn a feature of the state of the target object.

The present embodiment can intuitively reflect the difference using the thermodynamic diagram. In addition, the model better learns the feature of the state of the target object by adding features to the feature database.

Figure 5:
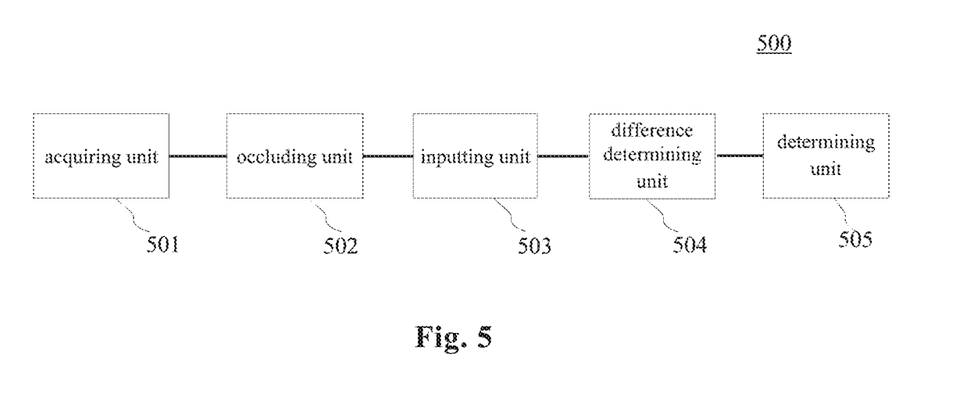
FIG. 5 is a schematic structural diagram of an apparatus for image processing for a vehicle according to some embodiments of the present disclosure.

Further referring to FIG. 5, as an implementation of the method shown in the above figures, the present disclosure provides an embodiment of an apparatus for image processing for a vehicle. The embodiment of the apparatus corresponds to the embodiment of the method shown in FIG. 2. The apparatus may be specifically applied to various electronic devices.

As shown in FIG. 5, the apparatus 500 for image processing for a vehicle of the present embodiment includes: an acquiring unit 501, an occluding unit 502, an inputting unit 503, a difference determining unit 504, and a determining unit 505. The acquiring unit 501 is configured to acquire an image presenting a target object; the occluding unit 502 is configured to occlude at least one area of the image to obtain at least one occluded image; the inputting unit 503 is configured to input the at least one occluded image into a pre-trained image processing model to obtain a driving parameter corresponding to each of the at least one occluded image, the image processing model being configured to characterize a corresponding relationship between a state of the object presented in the image and the driving parameter of the vehicle; the difference determining unit 504 is configured to determine, for each of the driving parameter corresponding to the at least one occluded image, a difference between the driving parameter and a real driving parameter corresponding to the acquired image; and the determining unit 505 is configured to determine whether the difference between the driving parameter of the occluded image occluding at least one area where the target object is located and the real driving parameter is greater than or equal to a difference threshold, to determine a degree of association between the state of the target object and the driving parameter.

In the present embodiment, the acquiring unit 501 of the apparatus 500 for image processing for a vehicle acquires an image locally or from another electronic device. The image is an image presenting a target object. The target object is an object presented in a randomly selected or manually set image. The target object may be a signal light (such as traffic lights).

In the present embodiment, the occluding unit 502 occludes at least one area of the image, and can obtain one occluded image by occluding each area. After occluding at least one different area, at least one different occluded image may be obtained. The areas are preset areas in the image, and may be areas of a given size or different sizes. The occluded image is an image in which an area is occluded.

In the present embodiment, the inputting unit 503 inputs the at least one different occluded image into a pre-trained image processing model to obtain driving parameters outputted by the image processing model. Each of the driving parameters corresponds to one occluded image, and a plurality of occluded images corresponds to a plurality of driving parameters. The image processing model is configured to characterize a corresponding relationship between a state of the object presented in the image and the driving parameter of the vehicle. The driving parameter is a parameter for controlling the vehicle involved in driving the vehicle, and affects the driving the vehicle. The image processing model may be trained by a classifier, such as a Support Vector Machine (SVM), or a Naive Bayes Model (NBM). Furthermore, the image processing model may be pre-trained based on some classification functions (e.g., a softmax function).

In the present embodiment, the difference determining unit 504 determines, for each of the above driving parameter corresponding to the at least one occluded image, a difference between the driving parameter and a real driving parameter corresponding to the above acquired image. The above acquired image has a corresponding real driving parameter. The real driving parameter is a driving parameter that is used by a driver when encountering the target object in the above acquired image during driving the vehicle in a real scenario that the driver is driving. The difference between the driving parameter and the real driving parameter may be obtained by subtracting the driving parameter from the real driving parameter or the real driving parameter from the driving parameter.

In the present embodiment, the determining unit 505 determines whether the difference between the driving parameter of the occluded image occluding at least one area where the target object is located and the real driving parameter is greater than or equal to the difference threshold, and then determines the degree of association between the state of the target object and the driving parameter. The degree of association is a degree of mutual association between an area including the target object in the image and the driving parameter.

In some alternative implementations of the present embodiment, the driving parameter includes a steering wheel angle and/or a driving speed.

In some alternative implementations of the present embodiment, the apparatus further includes: a generating unit configured to generate a thermodynamic diagram denoting the difference based on the difference between the driving parameter of the occluded image for each of the at least one occluded area and the real driving parameter.

In some alternative implementations of the present embodiment, the determining unit includes: a first determining module configured to determine the degree of association between the state of the target object and the driving parameter being strong, in response to determining the difference between the driving parameter of the occluded image occluding at least one area where the target object is located and the real driving parameter being greater than or equal to the difference threshold; and a second determining module configured to determine the degree of association between the state of the target object and the driving parameter being weak, in response to determining the difference between the driving parameter of the occluded image occluding at least one area where the target object is located and the real driving parameter being smaller than the difference threshold.

In some alternative implementations of the present embodiment, the apparatus further includes: a first training unit configured to train a pre-established image processing model based on an end to end approach to obtain the pre-trained image processing model; an extracting unit configured to extract a feature of the target object from at least one image presenting the target object; and an adding unit configured to add the extracted feature of the target object to a feature database of the image processing model.

Figure 6:
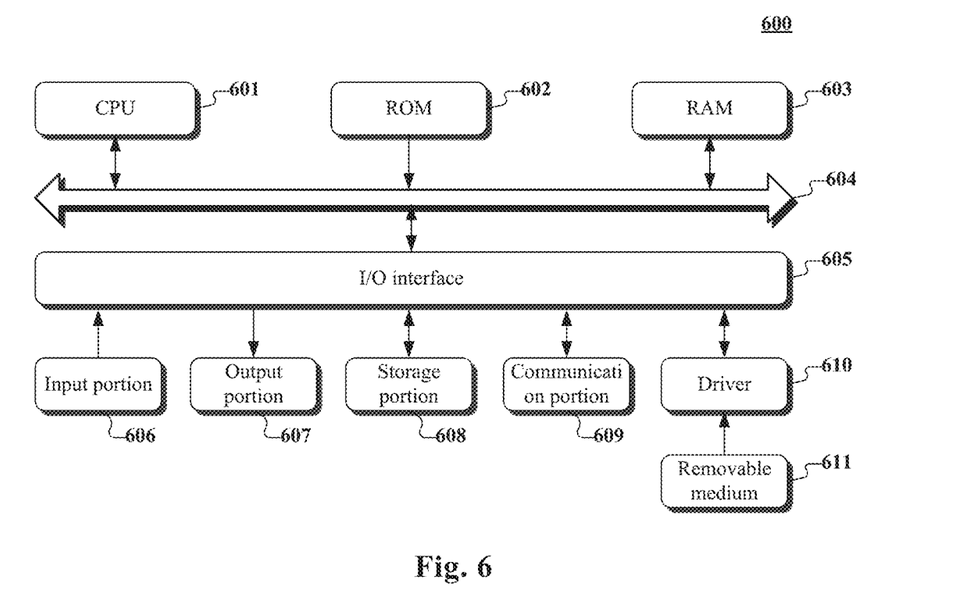
FIG. 6 is a schematic structural diagram of a computer system adapted to implement a vehicle of embodiments of the present disclosure.

Referring to FIG. 6, a schematic structural diagram of a computer system 600 adapted to implement a vehicle of embodiments of the present disclosure is shown. The vehicle shown in FIG. 6 is merely an example, and should not limit the functions and scope of use of the embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk, or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, such that a computer program read therefrom is installed on the storage portion 608 as needed.

In particular, according to the embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above functions as defined by the method of some embodiments of the present disclosure. It should be noted that the computer readable medium of some embodiments of the present disclosure may be a computer readable signal medium or a computer readable storage medium or any combination of the above two. An example of the computer readable storage medium may include, but is not limited to: an electric, magnetic, optical, electromagnetic, infrared, or semiconductor system, apparatus, element, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory device, or any suitable combination of the above. In some embodiments of the present disclosure, the computer readable storage medium may be any tangible medium containing or storing programs, which may be used by a command execution system, apparatus or element, or incorporated thereto. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logical functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor including an acquiring unit, an occluding unit, an inputting unit, a difference determining unit, and a determining unit. The names of the units do not constitute a limitation to such units themselves in some cases. For example, the acquiring unit may be further described as "a unit configured to acquire an image presenting a target object."

In another aspect, the present disclosure further provides a computer readable medium. The computer readable medium may be included in the apparatus in the above described embodiments, or a stand-alone computer readable medium without being assembled into the apparatus. The computer readable medium stores one or more programs. The one or more programs, when executed by the apparatus, cause the apparatus to: acquire an image presenting a target object; occlude at least one area of the image to obtain a plurality of different occluded images; input the plurality of occluded images into a pre-trained image processing model to obtain a driving parameter corresponding to each of the plurality of occluded images, the image processing model being configured to characterize a corresponding relationship between a state of the object presented in the image and the driving parameter of the vehicle; determine, for each of the plurality of driving parameters corresponding to the plurality of occluded images, a difference between the driving parameter and a real driving parameter corresponding to the acquired image; and determine whether the difference between the driving parameter of the occluded image occluding at least one area where the target object is located and the real driving parameter is greater than or equal to a difference threshold, to determine a degree of association between the state of the target object and the driving parameter.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for image processing for a vehicle, the method comprising:
    acquiring an image presenting a target object;
    occluding at least one area of the acquired image to obtain at least one occluded image;
    inputting the at least one occluded image into a pre-trained image processing model to obtain a driving parameter corresponding to each of the at least one occluded image, the pre-trained image processing model being configured to characterize a corresponding relationship between a state of the target object presented in the image and the obtained driving parameter of the vehicle;
    determining, for each obtained driving parameter, a difference between the obtained driving parameter and a real driving parameter corresponding to the acquired image, wherein the real driving parameter is a driving parameter that is used by a driver when encountering the target object of the acquired image when driving the vehicle in a real scenario that the driver is driving; and
    determining whether the difference between the driving parameter of the occluded image occluding the at least one area where the target object is located and the real driving parameter is greater than or equal to a difference threshold, to determine a degree of association between the state of the target object and the driving parameter, and to determine a learning status of the image processing model on a feature of the state of the target object.

2. The method for image processing for the vehicle according to claim 1, wherein the driving parameter comprises a steering wheel angle and/or a driving speed.

3. The method for image processing for the vehicle according to claim 1, wherein the method further comprises:
    generating a thermodynamic diagram denoting the difference based on the difference between the driving parameter corresponding to the occluded image for each of the at least one occluded area of the acquired image and the real driving parameter.

4. The method for image processing for the vehicle according to claim 1, wherein determining whether the difference between the driving parameter of the occluded image occluding the at least one area where the target object is located and the real driving parameter is greater than or equal to the difference threshold, to determine the degree of association between the state of the target object and the driving parameter comprises:
    determining the degree of association between the state of the target object and the driving parameter being strong, in response to determining the difference between the driving parameter of the occluded image occluding the at least one area where the target object is located and the real driving parameter being greater than or equal to the difference threshold; and
    determining the degree of association between the state of the target object and the driving parameter being weak, in response to determining the difference between the driving parameter of the occluded image occluding the at least one area where the target object is located and the real driving parameter being smaller than the difference threshold.

5. The method for image processing for the vehicle according to claim 1, wherein before inputting the at least one occluded image into the pre-trained image processing model to obtain the driving parameter corresponding to each of the at least one occluded image, the method further comprises:
    training a pre-established image processing model based on an end to end approach to obtain the pre-trained image processing model;
    extracting a feature of the target object from at least one image presenting the target object; and
    adding the extracted feature of the target object to a feature database of the pre-trained image processing model.

6. An image processing apparatus applied to a vehicle, the apparatus comprising:
    at least one processor; and
    a memory storing instructions, wherein the instructions when executed by the at least one processor, cause the at least one processor to perform operations, the operations comprising:
    acquiring an image presenting a target object;
    occluding at least one area of the acquired image to obtain at least one occluded image;
    inputting the at least one occluded image into a pre-trained image processing model to obtain a driving parameter corresponding to each of the at least one occluded image, the pre-trained image processing model being configured to characterize a corresponding relationship between a state of the target object presented in the image and the obtained driving parameter of the vehicle;
    determining, for each obtained driving parameter, a difference between the obtained driving parameter and a real driving parameter corresponding to the acquired image, wherein the real driving parameter is a driving parameter that is used by a driver when encountering the target object of the acquired image when driving the vehicle in a real scenario that the driver is driving; and determining whether the difference between the driving parameter of the occluded image occluding the at least one area where the target object is located and the real driving parameter is greater than or equal to a difference threshold, to determine a degree of association between the state of the target object and the driving parameter and to determine a learning status of the image processing model on a feature of the state of the target object.

7. The image processing apparatus applied to the vehicle according to claim 6, wherein the driving parameter comprises a steering wheel angle and/or a driving speed.

8. The image processing apparatus applied to a vehicle according to claim 6, wherein the operations further comprise:

generating a thermodynamic diagram denoting the difference based on the difference between the driving parameter corresponding to the occluded image for each of the at least one occluded area of the acquired image and the real driving parameter.

9. The image processing apparatus applied to a vehicle according to claim 6, wherein determining whether the difference between the driving parameter of the occluded image occluding the at least one area where the target object is located and the real driving parameter is greater than or equal to the difference threshold, to determine the degree of association between the state of the target object and the driving parameter comprises:

determining the degree of association between the state of the target object and the driving parameter being strong, in response to determining the difference between the driving parameter of the occluded image occluding the at least one area where the target object is located and the real driving parameter being greater than or equal to the difference threshold; and determining the degree of association between the state of the target object and the driving parameter being weak, in response to determining the difference between the driving parameter of the occluded image occluding the at least one area where the target object is located and the real driving parameter being smaller than the difference threshold.

10. The image processing apparatus applied to a vehicle according to claim 6, wherein the operations further comprise:

training a pre-established image processing model based on an end to end approach to obtain the pre-trained image processing model;

extracting a feature of the target object from at least one image presenting the target object; and adding the extracted feature of the target object to a feature database of the pre-trained image processing model.

11. A non-transitory computer readable storage medium, storing a computer program thereon, wherein the computer program, when executed by a processor, causes the processor to perform operations, the operations comprising:

acquiring an image presenting a target object;

occluding at least one area of the image to obtain at least one occluded image;

inputting the at least one occluded image into a pre-trained image processing model to obtain a driving parameter corresponding to each of the at least one occluded image, the pre-trained image processing model being configured to characterize a corresponding relationship between a state of the target object presented in the image and the obtained driving parameter of a vehicle;

determining, for each obtained driving parameter, a difference between each obtained driving parameter and a real driving parameter corresponding to the acquired image, wherein the real driving parameter is a driving parameter that is used by a driver when encountering the target object of the acquired image when driving the vehicle in a real scenario that the driver is driving; and determining whether the difference between the driving parameter of the occluded image occluding the at least one area where the target object is located and the real driving parameter is greater than or equal to a difference threshold, to determine a degree of association between the state of the target object and the driving parameter, and to determine a learning status of the image processing model on a feature of the state of the target object.

* * * * *